(12) United States Patent
Schoenfuss et al.

(10) Patent No.: US 9,261,059 B2
(45) Date of Patent: Feb. 16, 2016

(54) FUEL DELIVERY MODULE WITH FUEL FILTER

(71) Applicant: Ford Global Technologies, LLC, Dearborn, MI (US)

(72) Inventors: Steffen Schoenfuss, Odenthal (DE); Christina Kallas, Rommerskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 13/864,979

(22) Filed: Apr. 17, 2013

(65) Prior Publication Data

US 2013/0319549 A1 Dec. 5, 2013

(30) Foreign Application Priority Data

Apr. 25, 2012 (DE) .................. 10 2012 206 816

(51) Int. Cl.
| | |
|---|---|
| *F02M 37/22* | (2006.01) |
| *B60K 15/03* | (2006.01) |
| *F02M 37/10* | (2006.01) |
| *F02M 25/08* | (2006.01) |

(52) U.S. Cl.
CPC ............... *F02M 37/22* (2013.01); *B60K 15/03* (2013.01); *F02M 37/103* (2013.01); *F02M 37/106* (2013.01); *B60K 2015/03111* (2013.01); *B60K 2015/03453* (2013.01); *F02M 25/0836* (2013.01); *F02M 25/0854* (2013.01); *F02M 2037/228* (2013.01); *Y10T 137/794* (2015.04)

(58) Field of Classification Search
CPC .......... F04B 49/04; F04B 39/16; F02M 37/00
USPC ....................................................... 137/544
See application file for complete search history.

(56) References Cited

U.S. PATENT DOCUMENTS

| | | | | |
|---|---|---|---|---|
| 5,669,359 | A * | 9/1997 | Kleppner | B60K 15/077 123/509 |
| 5,762,049 | A * | 6/1998 | Jones | F02M 37/10 123/509 |
| 5,992,394 | A * | 11/1999 | Mukaidani | B01D 35/027 123/509 |
| 6,000,913 | A * | 12/1999 | Chung et al. | 417/53 |
| 6,436,287 | B1 * | 8/2002 | Fischerkeller et al. | 210/232 |
| 6,966,305 | B2 * | 11/2005 | Aubree | F02M 37/103 123/497 |
| 7,159,578 | B2 * | 1/2007 | Horvath | B60K 15/03504 123/518 |
| 7,556,024 | B2 * | 7/2009 | Crary et al. | 123/509 |
| 8,297,260 | B2 * | 10/2012 | Masuda | F02M 37/103 123/509 |

FOREIGN PATENT DOCUMENTS

| | | |
|---|---|---|
| DE | 10160567 A1 | 7/2002 |
| WO | WO 2011048333 A1 * | 4/2011 |

OTHER PUBLICATIONS

English Translation of WO2011048333.*
German Patent Office, Search/Patentability Report re: DE 102012206816.3 titled "Fuel Delivery Module with Fuel Filter," Jan. 23, 2013, 5 pages.

* cited by examiner

*Primary Examiner* — Nathan J Newhouse
*Assistant Examiner* — Connor Tremarche
(74) *Attorney, Agent, or Firm* — James Dottavio; Alleman Hall McCoy Russell & Tuttle LLP

(57) ABSTRACT

A vehicle fuel delivery apparatus, having: a surge chamber configured to store fuel; a fuel filter distally positioned with respect to and connected to the chamber; and a fuel level sender positioned between the filter and surge chamber.

15 Claims, 8 Drawing Sheets

FUEL DELIVERY MODULE WITH FUEL FILTER

CROSS-REFERENCE TO RELATED APPLICATIONS

This application claims the benefit of and priority to German Patent Application No. DE 102012206816.3 filed Apr. 25, 2012, the entire contents of which are hereby incorporated by reference for all purposes.

TECHNICAL FIELD

The present disclosure relates to fuel delivery devices for use in motor vehicles.

BACKGROUND

Fuel containers for modern vehicles include a surge chamber that is at least partially responsible for distributing fuel from a fuel tank (or container) to an internal combustion engine. Surge chamber designs can vary but the fuel travelling between the fuel tank and the internal combustion engine is typically filtered to some degree. With an increasing awareness of fuel economy it can be desirable to have larger volume filters included in the fuel tanks or have easily exchangeable filters disposed therein. The larger filters can, however, restrict packaging space for other items or present challenges for removal. Specifically, as taught in German Patent No. DE 10160567 A1 titled "Fuel pump module land procedure for its installation" a larger filter linked to the surge chamber can restrict the range or scope of a fuel level sensor. Especially, where a fuel tank has a varied bottom surface, it can be beneficial to have fuel level sensors with wide operating ranges used with larger filters.

Therefore it is desirable to have a fuel delivery module with fuel filter that accommodates the use of larger fuel filters but does not limit the packaging space for other items in the fuel system, e.g., fuel level sensors.

SUMMARY

The present disclosure addresses one or more of the above-mentioned issues. Other features and/or advantages will become apparent from the description which follows.

One advantage of the present disclosure is that it provides a fuel delivery module with fuel filter that accommodates the use of larger fuel filters but does not limit the packaging space for other items in the fuel system, e.g., fuel level sensors. Sensors can be positioned more proximate to the fuel delivery modules.

Because of its arrangement outside the surge chamber, the fuel filter of the fuel delivery module according to the present disclosure can be used even in fuel containers designed relatively shallow.

One exemplary embodiment relates to a fuel delivery module for arrangement in a fuel container of a vehicle, the module, including: a surge chamber for storing fuel; a fuel pump for conveying the fuel from the surge chamber to a fuel consumer; and a fuel filter through which the fuel flows. The fuel filter is received in a filter housing arranged separately from the surge chamber.

One exemplary embodiment relates to a vehicle fuel delivery apparatus, having a surge chamber configured to store fuel; a fuel filter distally positioned with respect to and connected to the chamber; and a fuel level sender positioned between the filter and surge chamber.

The invention will be explained in greater detail below by way of example with reference to the figures, in which the same reference numbers are used in the figures for identical or essentially identical elements. The above features and advantages and other features and advantages of the present teachings are readily apparent from the following detailed description for carrying out the invention when taken in connection with the accompanying drawings. In the figures:

DETAILED DESCRIPTION

Turning now to the figures, where like characters represent the same parts, there is shown therein a fuel delivery module configured to fit in a fuel container (or fuel tank). The illustrated fuel delivery module has a relatively larger fuel filter but does not limit the packaging space for other items in the fuel system, e.g., fuel level sensors (or a fuel level sender assembly).

Figure 1:
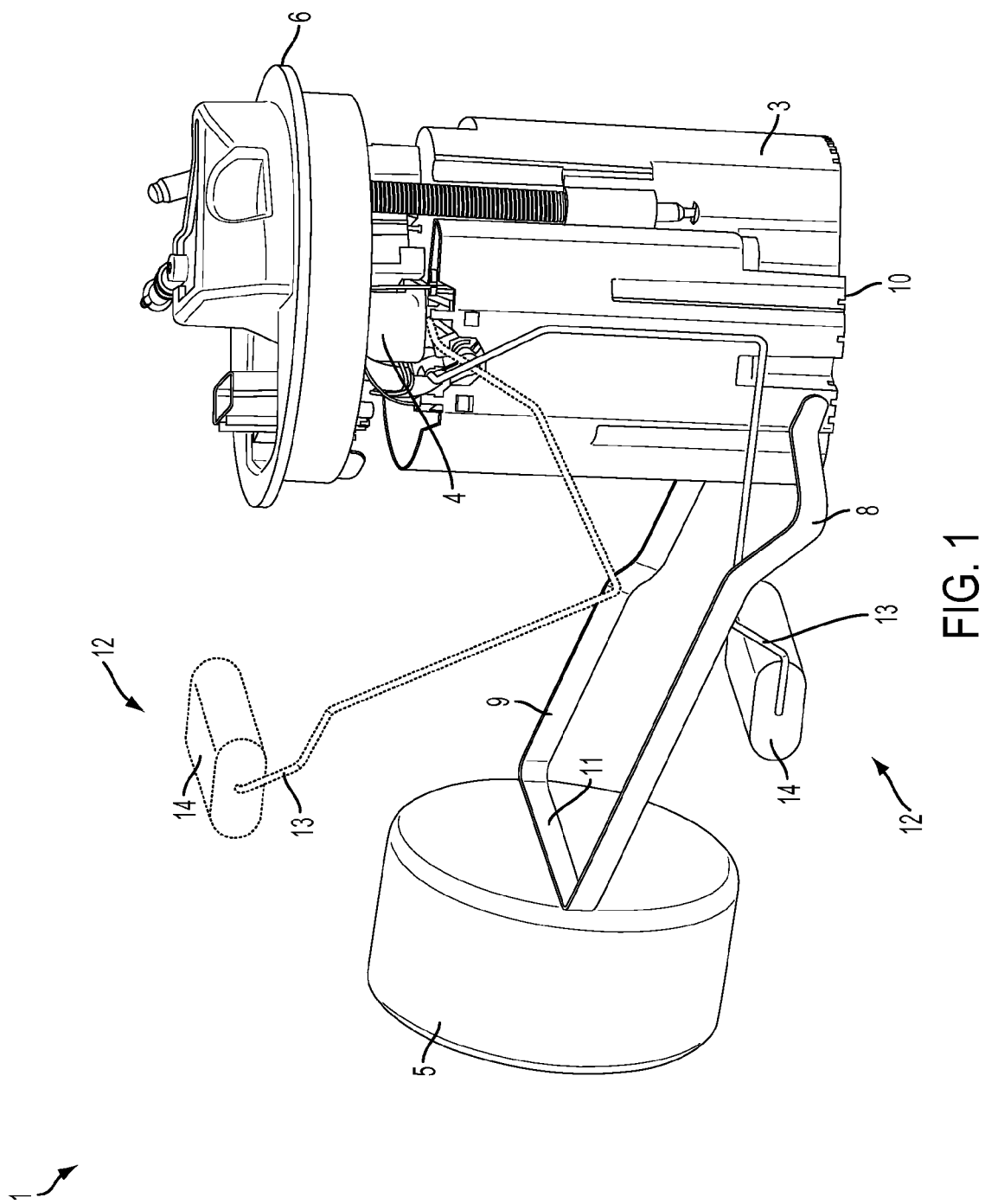
FIG. 1 is shows a perspective view a fuel delivery module according to an exemplary embodiment of the present disclosure.

With respect to FIG. 1 there is shown therein a first side view of a fuel delivery module 1 according to an exemplary embodiment of the present disclosure. Fuel delivery module 1 is designed for arrangement in a fuel container 2 (or fuel tank), as shown in FIGS. 4 to 8. The fuel container can be used in a vehicle, in particular a motor vehicle, having an internal combustion engine. The fuel delivery module 1 includes a surge chamber 3 serving as a reservoir for storing fuel; a fuel pump 4 for conveying the fuel from the surge chamber 3 to a fuel consumer, e.g., in particular an internal combustion engine; and a fuel filter through which the fuel conveyed by the fuel pump flows. The fuel filter is received in a filter housing 5 which, as can be seen in FIG. 1 is arranged outside the surge chamber 3.

In the fuel delivery module 1 shown in FIG. 1, the filter housing 5 has an inlet and an outlet which is each connected hydraulically to the fuel pump 4 via corrugated pipe conduits. The surge chamber 3 enables fuel delivery to the internal combustion engine even with an empty tank.

Figure 2:
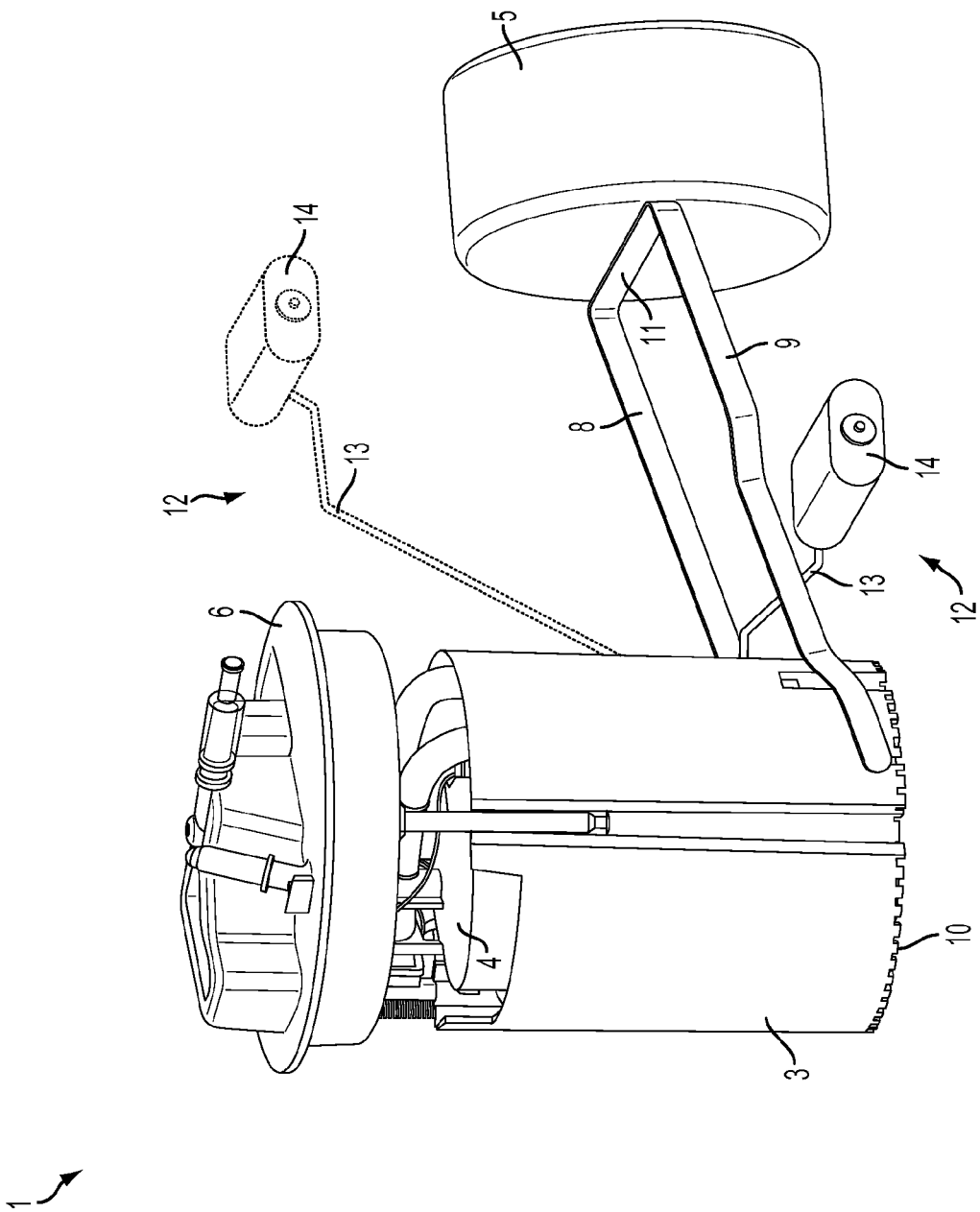
FIG. 2 is another perspective view the fuel delivery module of FIG. 1.
Figure 3:
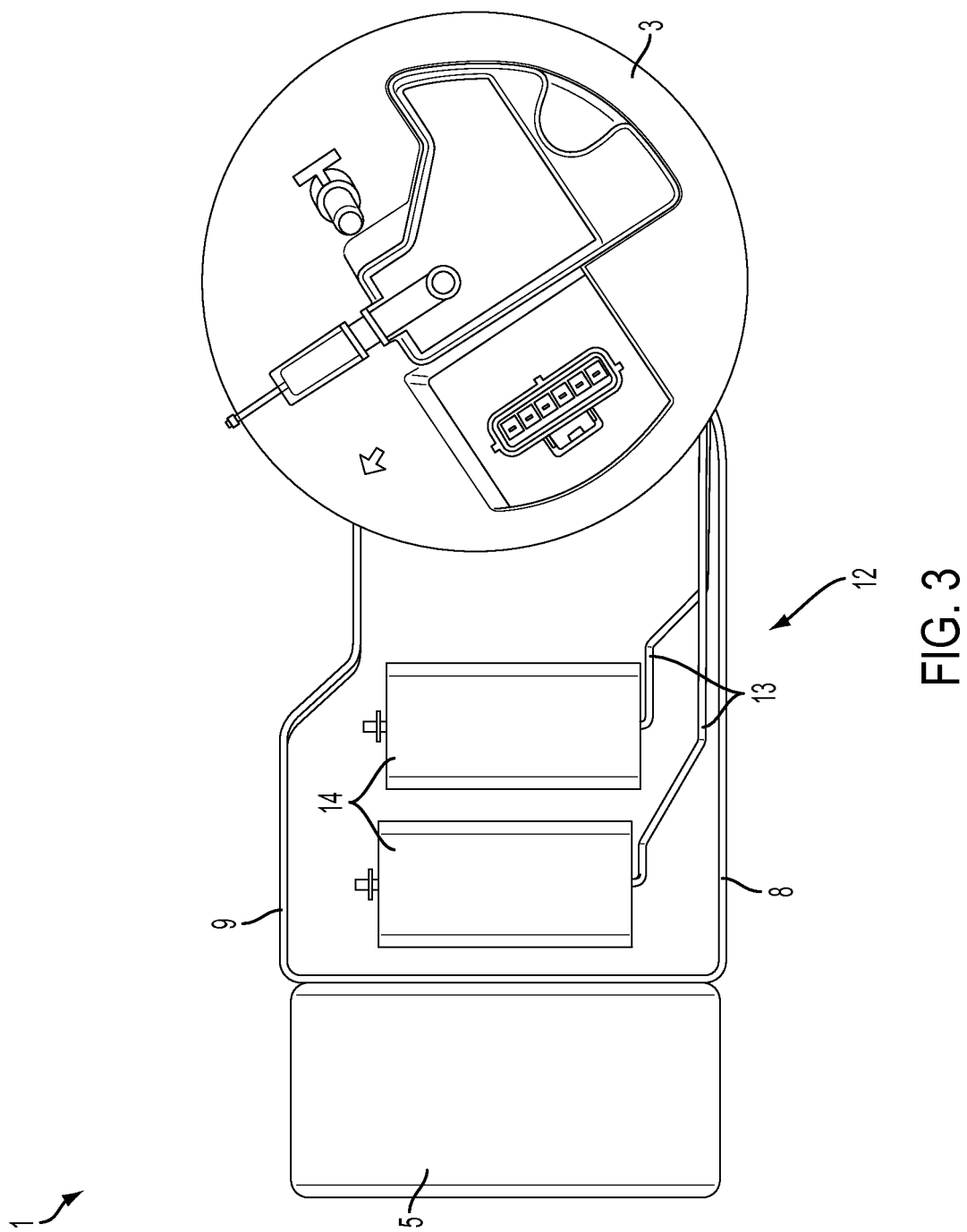
FIG. 3 is a top view of the fuel delivery module of FIG. 1.

As can be seen in FIGS. 1-3, the fuel pump 4 is arranged upright in the surge chamber 3. A central axis of the fuel pump 4 extends substantially parallel to a central axis of the surge chamber 3. The fuel delivery module 1 shown in FIG. 1 has a flange 6 (or sealing flange) that is arranged above the surge chamber 3. The flange 6 serves to fasten the fuel delivery module 1 to an upper wall 7 of the fuel container 2 shown in FIGS. 4 to 8.

As is apparent from FIG. 1, the filter housing 5 is arranged at a lateral distance from the surge chamber 3. Filter housing 5 is connected mechanically to an outer wall of the surge chamber 3 via a first and second connecting rod 8, 9. Fuel delivery module 1, which essentially comprises the surge chamber 3 and the filter housing 5, is connected via the connecting rods 8 and 9 to the outer wall of the surge chamber 3, and is therefore L-shaped. A first limb of the L-shape is formed by the filter housing 5 and the connecting rods 8 and 9 and the second limb of the L-shape is formed by the surge chamber 3. The filter housing 5 is arranged approximately at the level of a base 10 of the surge chamber 3 at a lateral distance (or laterally distal) from the surge chamber.

As can further be seen in FIG. 1, the connecting rods 8 and 9 are connected to one another on the filter housing side by means of a transverse member 11, so that the connecting rods 8 and 9 and the transverse member 11 form a bracket-like linkage. In the exemplary embodiment of the fuel delivery module 1 shown in FIG. 1, the filter housing 5 is connected rigidly to the transverse member 11. In contrast, the ends of the connecting rods 8 and 9 on the surge chamber side are pivoted (or pivotally connected) to the outer wall of the surge chamber 3. The connecting rods 8 and 9 can be swiveled at least within a certain angular range on the outer wall of the surge chamber 3 so that the limb of the L-shaped fuel delivery module 1 (formed by the filter housing 5 and the connecting rods 8, 9) can be swiveled with respect to the second limb of the L-shaped fuel delivery module 1 (formed by the surge chamber 3). This feature facilitates installation in the fuel container 2, as will be explained in more detail with respect to FIGS. 4 to 8.

As is further apparent from FIG. 1, the fuel delivery module 1 has a fuel level sender 12 pivoted to the outer wall of the surge chamber 3. The fuel level sender 12 includes a swiveling arm 13 having a proximate and a distal end, the proximate end of the swiveling arm 13 is pivoted (or pivotally connected) to the outer wall of the surge chamber 3 and a float 14 is retained on the distal end.

In FIG. 1, the fuel level sender 12 is shown in two different operating positions: first, a low position in which the float 14 is located approximately at the level of a surge chamber base 10; and second, a high position in which the float 14 is located approximately at the level of the flange 6. When installed in the fuel container 2, the fuel level sender 12 serves to ascertain the fuel level in the fuel container 2. Accordingly, the first, low position of the fuel level sender 12 represented in FIG. 1 corresponds approximately to an empty fuel container 2, and the second, high position of the fuel level sender 12 corresponds approximately to a full fuel container 2.

As is apparent from FIG. 1, the float 14 and the swiveling arm 13 holding the float 14 are arranged between the filter housing 5 and the surge chamber 3 in the first, low position, so that the fuel level sender 12 is disposed substantially parallel to the limb of the L-shaped fuel delivery module 1. As will be explained with respect to FIGS. 4 to 8, this position of the fuel level sender 12 allows for simple installation of the fuel delivery module 1 in the fuel container 2.

FIG. 2 shows a second side view of the fuel delivery module 1 represented in FIG. 1, viewed from the opposite side, and FIG. 3 shows a top view of the fuel delivery module 1.

FIGS. 4 to 8 illustrate five assembly steps explaining the installation of the fuel delivery module 1 in a fuel container 2 according to FIGS. 1 to 3. For this purpose the fuel container 2 has a standard installation opening 15 preferably in an upper wall 7.

Figure 4:
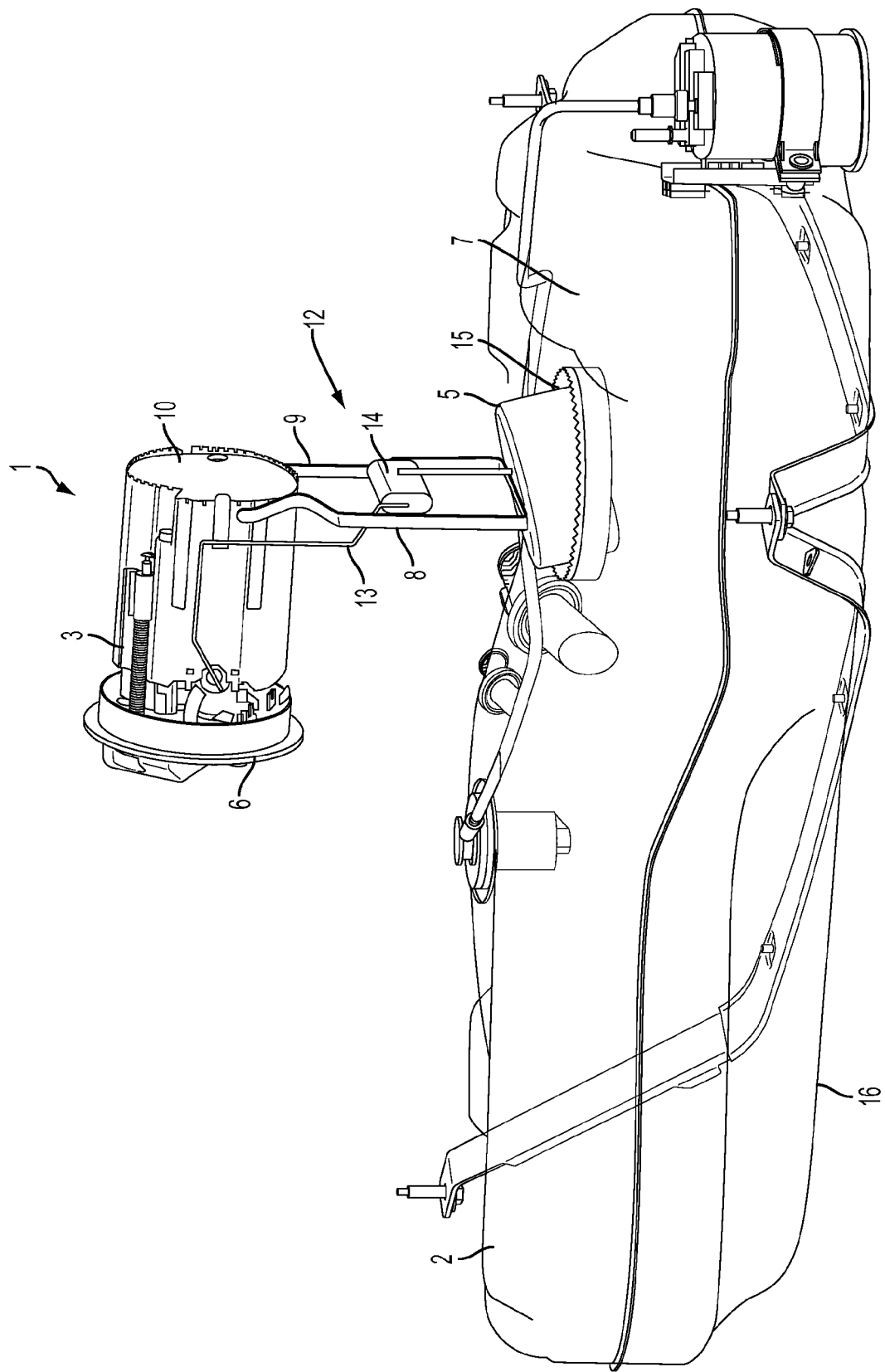
FIGS. 4-8 are assembly views of steps in assembling the fuel delivery module of FIG. 1 in a fuel container.
Figure 8:
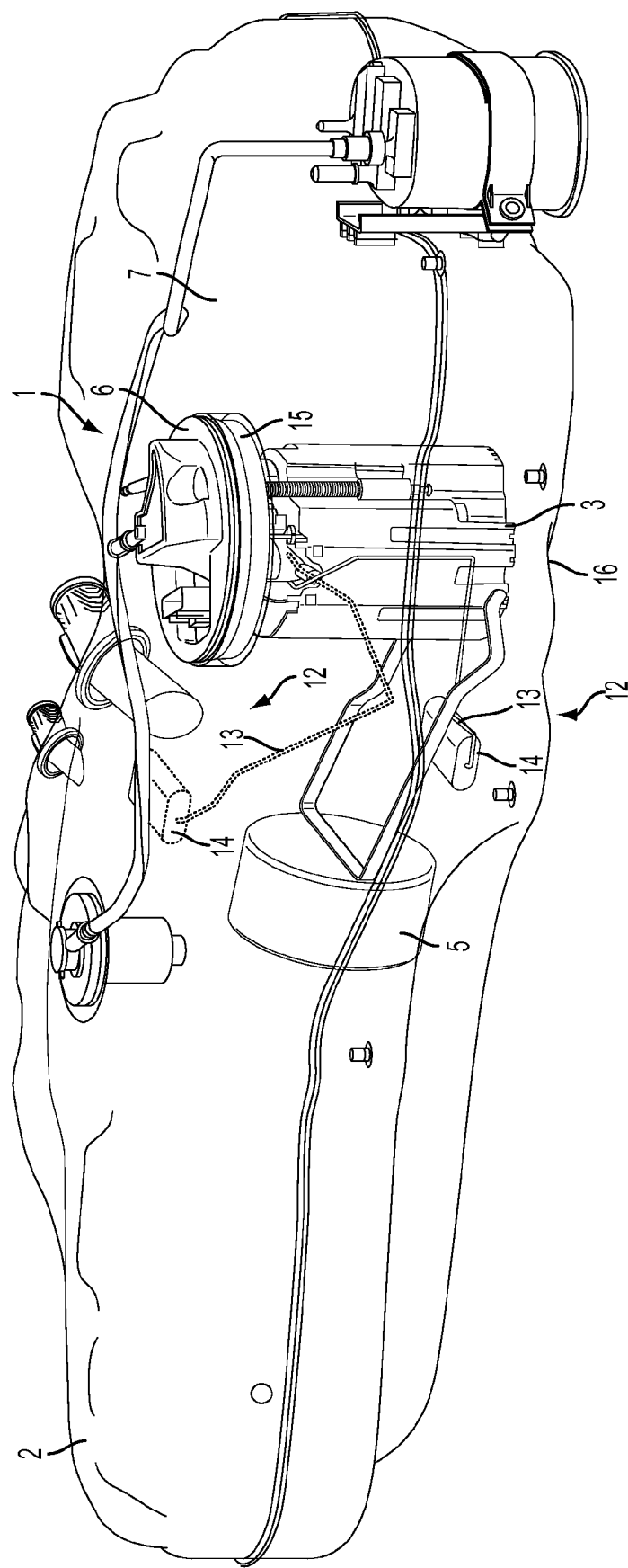

In the first assembly step, shown in FIG. 4, the fuel delivery module 1 is rotated through approximately 90° with respect to its final position installed in the fuel container 2, as shown in FIG. 8. A limb of the L-shaped fuel delivery module 1 is placed into the fuel container 2 through the installation opening 15. In this assembly step, the fuel level sender 12 is swiveled to the position in which the float 14 and the swiveling arm 13 holding it are arranged substantially between the filter housing 5 and the surge chamber 3, so that the fuel level sender 12 is aligned with the limb of the L-shaped fuel delivery module 1.

Figure 5:
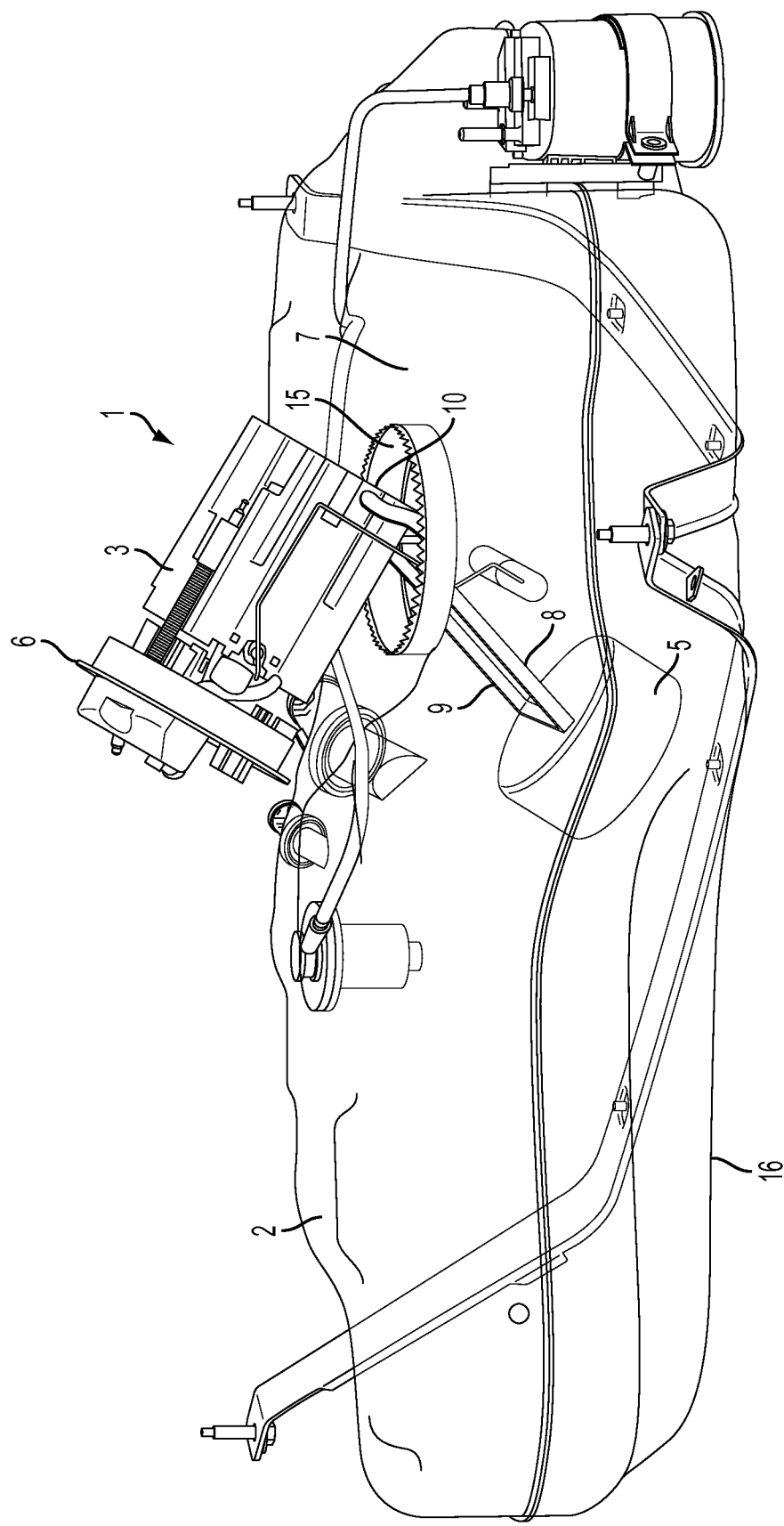

After the filter housing 5 and the float 14 of the fuel level sender 12 have been introduced into the fuel container 2, the fuel delivery module 1 can be rotated a certain amount in order also to introduce the second limb of the L-shaped fuel delivery module 1 through the installation opening 15, as is shown in FIG. 5. In this assembly step, where the base 10 of the surge chamber 3 is first passed through the installation opening 15, it is advantageous that the connecting rods 8 and 9 holding the filter housing 5 are mounted pivotally on the outer wall of the surge chamber 3. It is also generally sufficient that the connecting rods 8, 9 pivot only a small angular range, so that the connecting rods 8, 9 can be swiveled to some extent with respect to the surge chamber 3 in order to insert the surge chamber 3.

Figure 6:
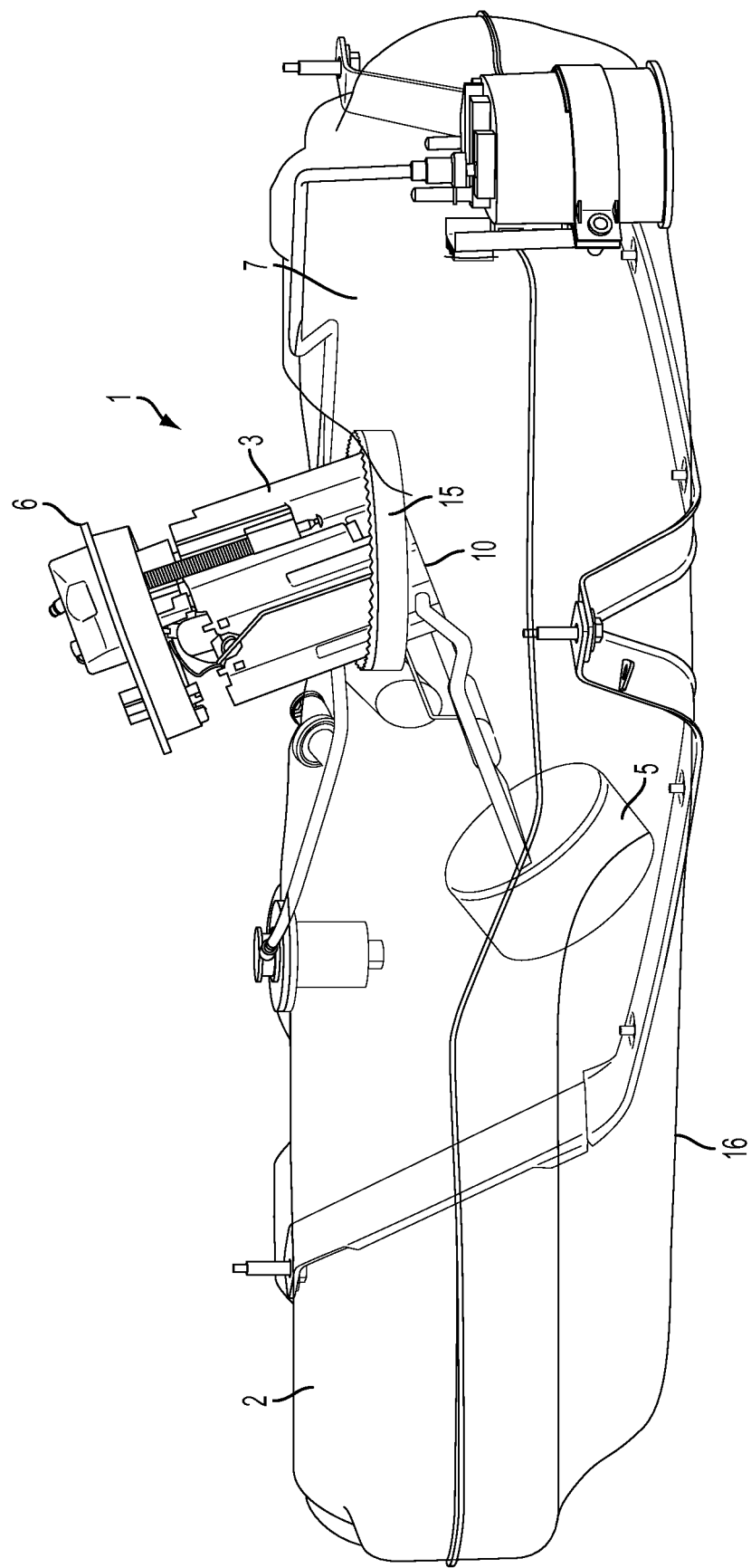

In the third assembly step shown in FIG. 6 the base 10 of the surge chamber 3 has already been passed through the installation opening 15 and the fuel delivery module 1 can be rotated further in the direction of its final installed position represented in FIG. 8.

Figure 7:
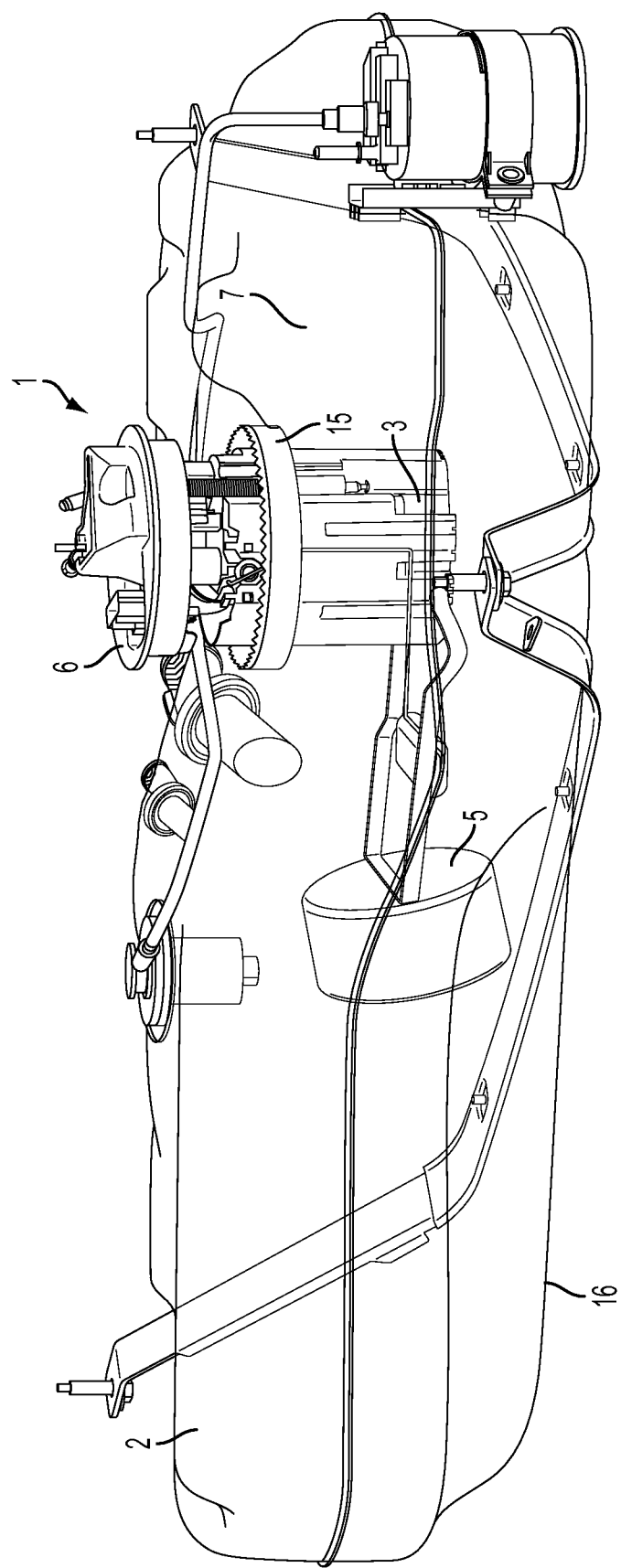

In the fourth assembly step shown in FIG. 7 the fuel delivery module 1 has already reached its final installation position with respect to the fuel container 2. In this installation direction a central axis of the surge chamber 3 of the fuel delivery module 1 extends substantially at right angles to a plane of extension of the upper wall 7 or of a bottom wall 16 of the fuel container 2. Starting from the fourth assembly step shown in FIG. 7, the fuel delivery module 1 can now be pushed further in the direction of the bottom wall 16 of the fuel container 2, until it has reached the fifth and last assembly state shown in FIG. 8.

In the final installed position of the fuel delivery module 1, as shown in FIG. 8, the filter housing 5 rests on the bottom wall 16 of the fuel container 2. The fuel delivery module 1 can now be screwed to the fuel container 2 by means of the flange 6.

As a result of the arrangement, the fuel filter 5 of the fuel delivery module 1 can be provided, even where the height of the container is substantially less than its width, i.e., with a filter volume and a corresponding dirt holding capacity such that this capacity is sufficiently large for an anticipated vehicle service life.

Furthermore, the loss of volume caused by the filter housing 5 through the arrangement of the fuel delivery module 1 in the fuel container 2 is extremely small, since the filter housing 5 and the fuel filter are completely filled with fuel during operation. Likewise, the connecting rods 8 and 9 cause a negligibly small loss of volume in the fuel container 2. In addition, because they are arranged completely inside the fuel container 2, the fuel delivery module 1, the fuel filter and the filter housing 5 are protected by the fuel container 2.

The above-described fuel delivery module in other embodiments is not restricted to the embodiment illustrated herein, but also includes further embodiments operating in the same way. For example, the filter housing arranged outside the surge chamber and/or the connecting rods connecting the filter housing to the surge chamber can also be used, for example, to reduce sloshing movements of the fuel in the fuel container. Likewise, it is possible, for example, to provide a form-fitting connection between the filter housing and the bottom wall of the fuel container, so that the loadings on the filter housing, for example through fuel sloshing or lateral accelerations, do not need to be transferred to the fuel delivery module solely by the connecting rods.

Furthermore, according to yet another advantageous configuration, the fuel delivery module is characterized by a flange arranged above the surge chamber. The fuel delivery module can thereby be fastened, for example screwed, preferably to an upper wall of the fuel container. A mechanically flexible, hydraulic connection between the fuel pump, the fuel filter or filter housing and the flange of the fuel delivery module can be implemented by means of corrugated pipe conduits, for example.

Those familiar with the art to which the invention relates will recognize various alternative designs and embodiments for practicing the invention within the scope of the appended claims.

We claim:

1. A fuel delivery module for arrangement in a fuel container of a vehicle, the module, comprising:
   a surge chamber for storing fuel;
   a fuel pump for conveying the fuel from the surge chamber to a fuel consumer;
   a fuel filter through which the fuel flows;
      wherein the fuel filter is received in a substantially cylindrical filter housing arranged separately from the surge chamber;
   a first connecting rod mechanically linking an outer wall of the surge chamber to the filter housing;
   a second connecting rod mechanically linking the outer wall of the surge chamber to the filter housing;
   a transverse member connected to a flat end of the filter housing and to filter-side ends of the first and second connecting rods, thereby providing an opening between the filter housing and the surge chamber when the fuel delivery module is assembled; and
   a fuel level sender pivotally attached to the outer wall of the surge chamber having a float retained by a swiveling arm,
      wherein the swiveling arm is configured to swivel at least to a position in which the float is arranged between the filter housing and the surge chamber, via a swivel path between the first and second connecting rods such that the float traverses the opening between the filter housing and the surge chamber responsive to changes in fuel level.

2. The fuel delivery module of claim 1, wherein the filter housing is arranged in a laterally distal position with respect to the surge chamber.

3. The fuel delivery module of claim 2, wherein the first and second connecting rods are pivotally attached to the outer wall of the surge chamber.

4. The fuel delivery module of claim 3, wherein the swiveling arm is configured to swivel at least to a position in which the float is arranged between the filter housing and the surge chamber when the fuel delivery module is in a final installed position in the fuel container.

5. The fuel delivery module of claim 4, wherein the fuel pump is arranged in the surge chamber.

6. The fuel delivery module of claim 5, further comprising:
   a flange arranged above the surge chamber and configured for fastening the surge chamber to an upper wall of the fuel container.

7. The fuel delivery module of claim 1, wherein the first and second connecting rods are pivotally attached to the outer wall of the surge chamber.

8. A vehicle fuel delivery apparatus, comprising:
   a surge chamber configured to store fuel;
   a fuel filter distally positioned with respect to and connected to the surge chamber and in a filter housing;
   first and second connecting rods mechanically linking an outer wall of the surge chamber to the filter housing;
   a transverse member connected to the filter housing and to filter-side ends of the first and second connecting rods, thereby providing an opening between the filter housing and the surge chamber when the vehicle fuel delivery apparatus is assembled; and
   a fuel level sender positioned between the fuel filter and surge chamber when the vehicle fuel delivery apparatus is in a final installed position in a vehicle fuel container, the fuel level sender pivotally attached to the outer wall of the surge chamber having a float retained by a swiveling arm, wherein the swiveling arm is configured to swivel at least to a position in which the float is arranged between the filter housing and the surge chamber, via a swivel path between the first and second connecting rods such that the float traverses the opening between the filter housing and the surge chamber responsive to changes in fuel level.

9. The vehicle fuel delivery apparatus of claim 8, wherein the fuel level sender includes a sender configured to read high-level and low-level fuel levels.

10. The vehicle fuel delivery apparatus of claim 9, wherein the fuel level sender includes the float.

11. The vehicle fuel delivery apparatus of claim 10, further comprising:
   a bracket connecting the surge chamber and fuel filter comprising the first connecting rod mechanically linking the outer wall of the surge chamber to the filter housing, and the second connecting rod mechanically linking the outer wall of the surge chamber to the filter housing.

12. The vehicle fuel delivery apparatus of claim 11, wherein the bracket is pivotally attached to the surge chamber to enable the fuel filter to be laterally disposed with respect to the surge chamber.

13. The vehicle fuel delivery apparatus of claim 12, further comprising:
   a pump linked to the surge chamber.

14. The vehicle fuel delivery apparatus of claim 13, further comprising:
   a sealing flange on the surge chamber configured to fasten the surge chamber to the fuel container.

15. The vehicle fuel delivery apparatus of claim 14, wherein the pump is arranged in the surge chamber.

* * * * *